US012744376B2

(12) United States Patent
Vancu et al.

(10) Patent No.: US 12,744,376 B2
(45) Date of Patent: Sep. 22, 2026

(54) INRUSH CURRENT LIMITING CIRCUIT

(71) Applicant: ABB Schweiz AG, Baden (CH)

(72) Inventors: Florian Vancu, Schlieren (CH); Markus Fueglister, Muelligen (CH)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 18/544,585

(22) Filed: Dec. 19, 2023

(65) Prior Publication Data

US 2024/0154405 A1 May 9, 2024

Related U.S. Application Data

(63) Continuation of application No. PCT/EP2021/066943, filed on Jun. 22, 2021.

(51) Int. Cl.
*H02H 9/02* (2006.01)
*H02H 9/00* (2006.01)

(52) U.S. Cl.
CPC ............ *H02H 9/025* (2013.01); *H02H 9/001* (2013.01)

(58) Field of Classification Search
CPC .............................. H02H 9/001; H02H 9/025
See application file for complete search history.

(56) References Cited

U.S. PATENT DOCUMENTS 3,935,511 A * 1/1976 Boulanger ............ H02H 9/001 361/111
5,087,871 A 2/1992 Losel
5,666,254 A * 9/1997 Thomas ................ H02H 9/026 361/13
2013/0187543 A1 7/2013 Chang et al.
2017/0141565 A1 5/2017 White
2020/0028353 A1 1/2020 Leitner
2020/0234656 A1* 7/2020 Seo ......................... G09G 3/20

FOREIGN PATENT DOCUMENTS

EP 2835886 A2 2/2015
EP 3618250 B1 2/2021
JP 61-098393 U 6/1986
JP 01-270727 10/1989

(Continued)

OTHER PUBLICATIONS

European Patent Office, International Search Report in International Patent Application No. PCT/EP2021/066943, 3 pp. (Mar. 15, 2022).

(Continued)

*Primary Examiner* — Thienvu V Tran
*Assistant Examiner* — Christopher J Clark
(74) *Attorney, Agent, or Firm* — Fitch Even Tabin & Flannery LLP

(57) ABSTRACT

An inrush current limiter circuit for a rectifier provides a flow of a current between a rectifying part of the rectifier and a filter capacitance. A power stage includes a power stage resistor and a power stage transistor disposed in parallel circuit arrangement to the power stage resistor. The power stage resistor conducts an amount of the current in dependence on the state of the power stage transistor, and the power stage transistor conducts an amount of the current in dependence on a charging of a gate capacitance of the power stage transistor.

18 Claims, 2 Drawing Sheets

(56) References Cited

FOREIGN PATENT DOCUMENTS

| | | | |
|---|---|---|---|
| JP | 03-150022 | A | 6/1991 |
| JP | 09-298834 | A | 11/1997 |
| JP | 2013-149593 | A | 8/2013 |
| JP | 2013-222607 | A | 10/2013 |
| WO | WO 2012/122616 | A1 | 9/2012 |

OTHER PUBLICATIONS

European Patent Office, Written Opinion in International Patent Application No. PCT/EP2021/066943, 6 pp. (Mar. 15, 2022).

Intellectual Property India, Examination Report in Indian Patent Application No. 202447004264, 7 pp. (Nov. 11, 2025).

Notice in Reference of Indian Application No. 202447004264; dated May 12, 2026; 3 pages.

* cited by examiner

INRUSH CURRENT LIMITING CIRCUIT

CROSS-REFERENCE TO RELATED APPLICATIONS

The instant application claims priority to International Patent Application No. PCT/EP2021/066943, filed Jun. 22, 2021, which is incorporated herein in its entirety by reference.

FIELD OF THE DISCLOSURE

The present disclosure generally to an inrush current limiter circuit for a rectifier, a rectifier, and a method for limiting an inrush current of a rectifier flowing between a rectifying part of the rectifier and a filter capacitance.

BACKGROUND OF THE INVENTION

Rectifiers may be exposed to voltage steps that may for example occur when the rectifier is switched on or at short outages. In case of voltage steps at the input of a capacitive filtered circuit, the discharged DC bus capacitors present a low impedance across the input since the ESR (equivalent series resistance) of an electrolytic capacitor varies strongly with capacitor value and supplier, ranging from a few ohms to tens of milliohms. A large input voltage step from a low impedance voltage source such as a DC battery causes a high current spike, leading to a range of problems, starting from unnecessary aging of the capacitors, up to tripping of the input fuse or permanent damage of components.

BRIEF SUMMARY OF THE INVENTION

The present disclosure generally describes an improved rectifier with an effective inrush current limiting circuit. The described embodiments pertain to an inrush current limiter circuit for a rectifier, the rectifier, the method for limiting an inrush current of a rectifier flowing between a rectifying part of the rectifier and a filter capacitance and the use of the inrush current limiter circuit. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter. Technical terms are used by their common sense. If a specific meaning is conveyed to certain terms, definitions of terms will be given in the following in the context of which the terms are used.

According to a first aspect, an inrush current limiter circuit for a rectifier is provided, wherein the inrush current limiter circuit provides a flow of a current between a rectifying part of the rectifier and a filter capacitance. The inrush current limiter circuit comprises a power stage, wherein the power stage comprises a power stage resistor (108) and a power stage transistor parallel to the power stage resistor. The power stage resistor is configured to conduct an amount of the current in dependence on the state of the power stage transistor. The power stage transistor is configured to conduct an amount of the current in dependence on a charging of a gate capacitance of the power stage transistor.

BRIEF DESCRIPTION OF THE SEVERAL VIEWS OF THE DRAWING(S)

FIGS. 1*a* and 1*b* are diagrams of a rectifier comprising an inrush current limiter circuit in accordance with the disclosure.

DETAILED DESCRIPTION OF THE INVENTION

Figures 1A, 1B:
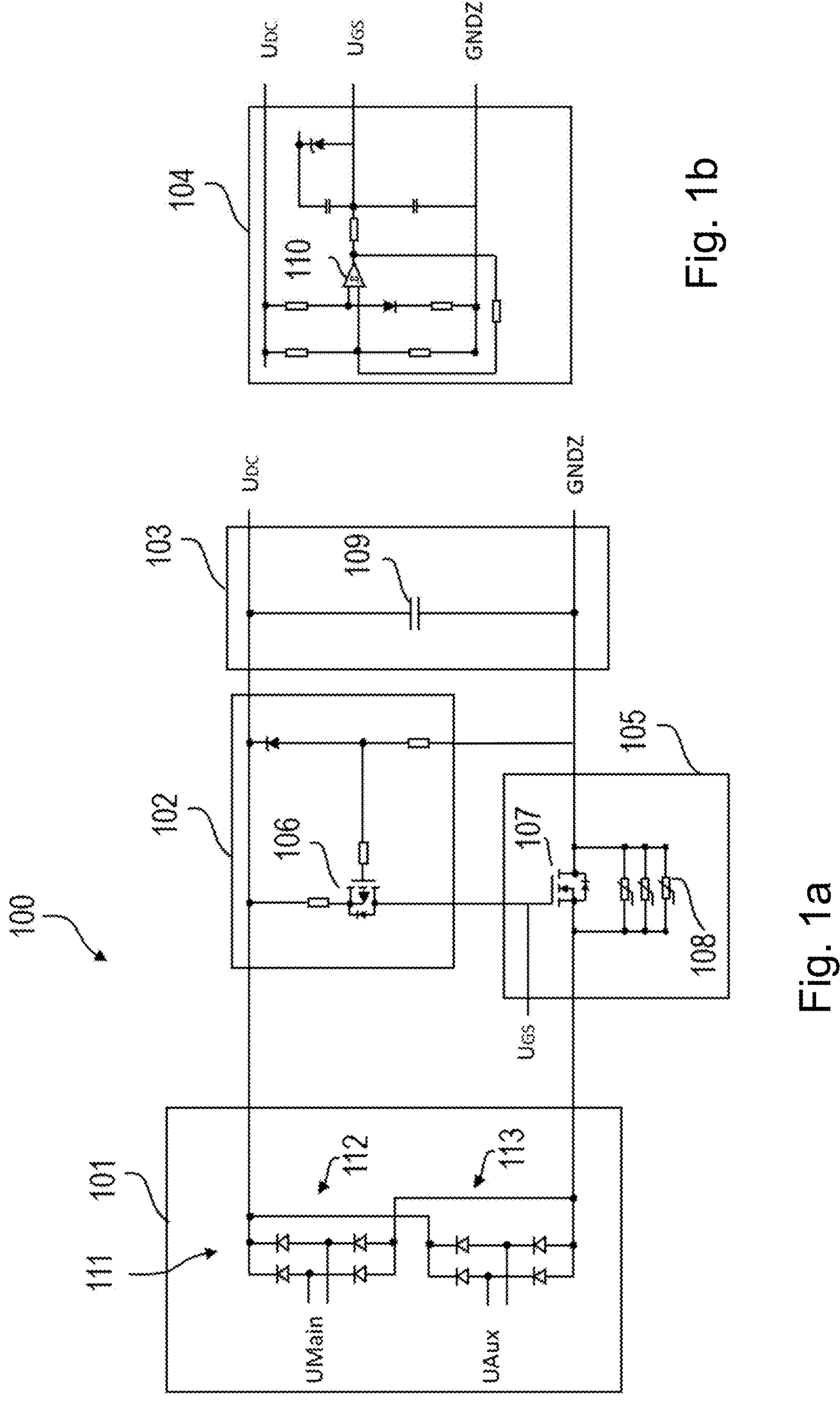

FIGS. 1*a* and 1*b* show a simplified schematics of a rectifier 100 comprising an inrush current limiter circuit 102, 104, 105 (shown in FIG. 1*a*) according to an embodiment. The rectifier comprises a rectifying stage 101 with a diode bridge 111, a constant current source 102 as one of the current limiter circuit blocks 102, 104, 105 with a transistor 106, a DC output stage 103 with a filtering capacitor 109, an inrush current block 105, which is referred to as power stage, and a further inrush current block 104 (shown in FIG. 1*b*), which is referred to as re-trigger circuit 104 in this disclosure. The rectifying stage 101 in FIGS. 1*a* and 1*b* includes two bridge arrangements 112, 113. The first bridge arrangement 112 may be connected to AC Main, the second one 113 to AC Main (UMain) or AC Auxiliary (UAux). The capacitor 109 of the output stage 103 filters the output voltage of the rectifying stage 101. UDC designates the positive DC bus, and GNDZ electrical ground.

When switching on the rectifier, the capacitor 109 will be loaded resulting in a high inrush current. The same applies at any positive voltage jumps. In order to limit the inrush current, the inrush current block 105 is inserted, which comprises in the example of FIG. 1 a bank of parallel NTC resistors 108 and a transistor 107. When switching on the rectifier, transistor 107 is not yet conducting, and the NTC resistors 108 have a high resistance, hence limiting the inrush current. Meanwhile, the gate voltage of transistor 107 is slowly increased by the current provided by the constant current source 102 that is controlled using transistor 106 resulting in an increase the current through transistor 107 until it is fully switched on. Therefore, the resistors 108 conduct the complete current when transistor 107 is turned off, a part of the current if the transistor is partly conducting, and nearly no current if transistor 107 is turned on such that quasi the full nominal current after the inrush period is conducted by the transistor 107. The setting of an appropriate time constant allows balancing of the inrush current between the power MOSFET and the resistors in parallel.

When the rectifier 100 is switched on, the high inrush current is first limited by the high resistance of the cold NTC resistors. Contemporarily, the constant current source 102 loads slowly the gate of transistor 107, such that the constant current source 102 enables a transition phase of the transistor between conducting no current and fully conducting. In this way, the NTC resistors 108 are released from conducting a high current when the temperature raises and the resistance is decreases, and thus getting too hot. On the other side, it is avoided that transistor 107 conducts the high inrush current in the first phase after a voltage jump.

In operation, there may occur a further voltage jump, for example, due to a short outage, e.g., on grid side. For this case, the re-trigger circuit 104 is used to reset transistor 107. The trigger circuit 104 is connected to the power stage 105 at the UGS lines shown in FIG. 1. The re-trigger circuit 104 comprises a comparator 110 that compares the voltage of a voltage divider and a voltage that is, in the example of FIG. 1, determined by a resistor and a capacitor such that a positive voltage jump is detected. When detecting the voltage jump, the re-trigger circuit 102 lowers the gate voltage below the transistor threshold voltage such that the transistor 107 is switched off. Then, the procedure starts again by slowly charging the gate of transistor 107 by the constant current source 102.

Figure 2:
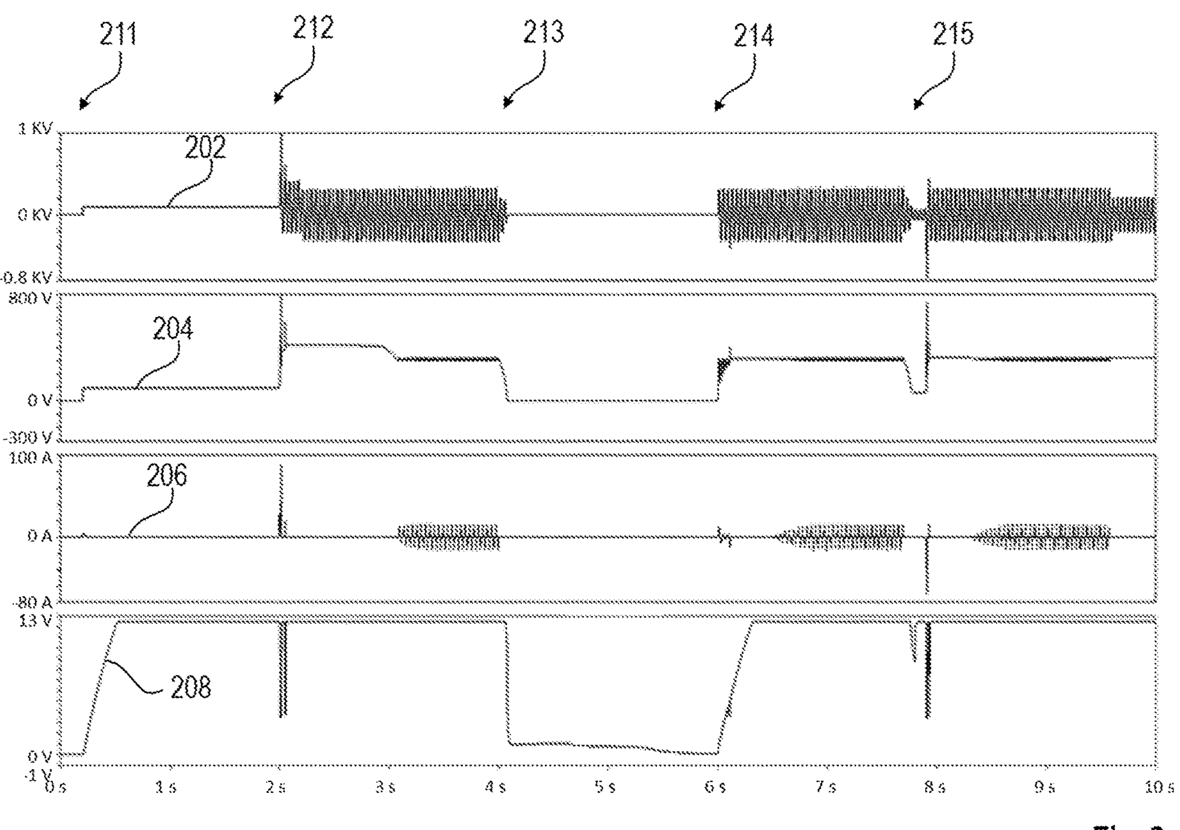
FIG. 2 is a simulation plot of an inrush current limiter circuit in accordance with the disclosure.

FIG. 2 shows the characteristic waveforms of a simulation with some scenarios applied to the circuit shown in FIGS. 1*a* and 1*b*. Plot 202 depicts the input voltage with several voltage steps:

At t=0.1 sec, 211: jump from 0V to 100 Vdc,

At t=1.0 sec, 212: jump from 100 Vdc to 230 Vac,

At t=2.0 sec, 213: 1 second interruption of input voltage,

At t=3.0 sec, 214: jump from 0V to 230 Vac,

At t=3.85 sec, 215: 100 ms interruption of the input voltage.

Plot 204 shows the corresponding DC output voltage, plot 206 the input current, i.e., including the inrush current at the voltage jumps, and plot 208 the gate voltage of the current limiting power MOSFET 107 shown in FIGS. 1*a* and 1*b*.

At the start-up 211, the gate voltage 208 of transistor 107 is slowly increased by a constant, voltage independent, current that is regulated by the P-channel MOSFET 106 of the constant current source 102. Any following voltage jumps would not be limited by current state-of-the-art topologies. As shown in the plot 202, the input voltage increases at 212 and causes a drop in the gate-voltage 208 of transistor 107. This drop of the voltage is effected by the comparator 110 that lowers the gate voltage below the transistor threshold voltage. This means, if any of the input lines (UMAIN or UAUX) has a positive delta of more than 15V (all filtered) the inrush current limiter turns on (or the gate-source voltage U_GS will be discharged to as low as gate-source threshold voltage U_GS_threshold) and current flows just trough the NTCs in the next moment. Consequently, the current limiting process restarts. At 213, the DC voltage is zero such that the gate voltage drops to nearly zero and the AC voltage at 214 effects a rise of the gate voltage similar to the one shown for the start-up phase 211.

Figure 3:
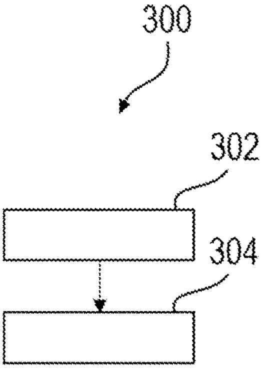
FIG. 3 is a flowchart for a method in accordance with the disclosure.

FIG. 3 shows a flow diagram of a method 300 for limiting an inrush current of a rectifier flowing between a rectifying part 101 of the rectifier and a filter capacitance 109, wherein the inrush current limiter circuit comprises a power stage 105 with a power stage resistor 108 and a power stage transistor 107 parallel to the resistor 108. The method comprises various steps. In a first step 302, the power resistor 108 conducts an amount of the current in dependence on the state of the power stage transistor 107. In a subsequent step 304, the power stage transistor conducts an amount of the current in dependence on a charging of a gate capacitance of the power stage transistor 107.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

In the present disclosure, the term "inrush current" designates the current that occurs when the rectifier is switched on, and which charges the unloaded DC filter capacitor (or in general a capacitive load). The same effect occurs at voltage jumps on the DC lines. The voltage jump may be, for example, 15 V.

The power stage is the main block of the inrush current limiter circuit since it comprises the components that are finally responsible for the flow of the current between the rectifying stage and the filter capacitor. The components are a resistor and a transistor such as a MOSFET or other power transistor. The resistor may be an arrangement of several transistors connected in parallel to distribute the current over more than one single resistor. Since the resistor is connected in-line, it conducts the full inrush current, limited according to the characteristics of the resistor, if the transistor is switched off. If the transistor is in a state between a switch-off state and a switch-on state, the resistor conducts a part of the inrush current, and if the transistor is switched on, it conducts no or nearly no current. In other words, the amount of the current flowing through the resistor and the transistor depends on the charging of the gate capacitance of the transistor. Of course, there may be further dependencies such as the voltage and characteristics of the resistor and the transistor.

The circuit allows switching the transistor in such a way that the current is flowing either through the resistors or through the transistors, and in a short transition time through both. In this way the inrush current can be limited by the resistors, and the current limitation can be removed whereby the resistors are relieved.

According to an embodiment, the inrush current limiter circuit further comprises a constant current source. The constant current source is configured for charging the gate capacitance of the power stage transistor.

The charging of the gate capacitance of the power stage transistor is performed by the constant current source. The charging may take some time such that in a first phase, the transistor is switched off so to limit the inrush current, in a second phase, the transistor is in a short transient state, where it does not conduct fully, and in a third state, the transistor is switched-on such that the current limitation can be removed whereby the resistors are relieved. Due the short transition phase, a relatively smooth re-distribution of the inrush current from the resistor to the transistor is achieved. The resistor thus fulfills its current limiting scope and is released by the transistor during nominal operation.

According to an embodiment, the constant current source is configured to charge the gate capacitance power stage transistor according to a configured time constant.

The constant current source may comprise a transistor such as a MOSFET that is wired to resistors and/or other devices that influence the amount of current that this provided to the gate of the power stage transistor. The time constant may be changed by adjusting the values of these devices.

According to an embodiment, the Inrush current limiter circuit further comprises a re-trigger circuit. The re-trigger circuit is configured to detect a DC bus voltage jump, and to turn the transistor off if it has detected that there has been a DC bus voltage jump.

This may be accomplished by pulling down the gate voltage of the power stage transistor below its threshold voltage. Since the gate capacitor then is discharged, the gate capacitor has to be charged again by the constant current source. Similar to the above-described case when switching on the rectifier, the resistors conduct the inrush current, thereby limiting the current until the transistor becomes conductive.

According to an embodiment, the re-trigger circuit comprises a comparator configured to compare a delayed voltage based on the DC bus voltage with an un-delayed voltage based on the DC bus voltage, and to determine that a DC bus voltage jump has been occurred if the comparison results in a difference voltage higher than a threshold value.

According to an embodiment, the re-trigger circuit comprises a Schmitt trigger configured for detecting of a DC bus voltage jump.

The comparator may be for example a Schmitt trigger. The delay may be effected by a capacitor. For example, the first and the second input voltages for the comparator are the same when no jump happens. In case of a jump, however, the first input voltage changes immediately to a new value and the second input first remains roughly at the same level than before the jump and then converges to the new value such that the input values are equal again. As long as the voltage difference starting at a point in time directly after the jump is higher than a threshold of the comparator, a signal is generated that pulls the gate of the transistor down.

According to an embodiment, the re-trigger circuit comprises a logic device to generate a control signal to turn the transistor off.

Instead of or supported by an analog solution such as using a capacitor as described above, a digital solution may be applied using, for example, a logic device such as a DSP, CPLD, FPGA or other logic components. In general, any logic device or arrangement of logic devices may be used.

According to an embodiment, the resistor, i.e. the inrush current limiting resistor parallel to the transistor, is an NTC, a PTC or a temperature independent power resistor.

The effect when using for example an NTC is that the resistance is high when switching on the rectifier because the NTC is cold, and the resistance gets lower when transiting to or during nominal operation as the NTC is getting hotter. Therefore, the inrush current is severely limited initially, and the limitation decreases over time. Thus, the limitation is carried out in an effective way. However, also, for example, a PTC or a temperature independent power resistor may be used.

According to an embodiment, the transistor is a MOSFET transistor.

Ideally, components with a threshold voltage U_GS (Gate-Source) of 4 . . . 7 V and a saturation of for example U_GS of 10 V may be used. The MOSFET may be a SiC or a Si MOSFET.

According to a further aspect, a rectifier comprising an inrush current limiter circuit as described herein with a power stage is provided.

According to an embodiment, the power stage of the inrush current limiter circuit is arranged in a negative or a positive DC path of the rectifier.

The choice between positive path and negative path may be based on the availability of suitable MOSFETs types on the market or on other design aspects. Preferably, the power stage is arranged in the negative path.

When the power stage is arranged in the negative path, the detection of the voltage jumps and the supply of the described circuits may be obtained by the positive DC bus voltage or obtained by voltages that are derived therefrom.

According to an embodiment, the rectifier is configured to supply the constant current source over a positive DC bus voltage of the rectifier.

As such, the drain of the MOSFET of the constant current source circuit may be a P-channel MOSFET whose Source is coupled through a resistor to the positive DC voltage and whose Drain is connected to the Gate of the power stage MOSFET.

According to a further aspect, the rectifier is a capacitor-filtered bridge rectifier.

According to a further aspect, a method for limiting an inrush current of a rectifier flowing between a rectifying part of the rectifier and a filter capacitance is provided. wherein the inrush current limiter circuit comprises a power stage with a power stage resistor and a power stage transistor parallel to the resistor. The method comprises the steps of conducting, by the power stage resistor, an amount of the current in dependence on the state of the power stage transistor, and conducting, by the power stage transistor, an amount of the current in dependence on a charging of a gate capacitance of the power stage transistor.

The method may further comprise that after switching on the rectifier the transistor is off and the resistor of the power stage conducts the inrush current. After charging the gate capacitance, the transistor of the power stage is switched on for conducting the current.

The method may further comprise discharging the gate capacitance in case of a voltage jump and further steps as described in this disclosure.

According to a further aspect, a use of an inrush current limiter circuit as described herein in a rectifier is provided. The inrush current limiter circuit may be used further in any energy storage where the amount of stored energy is a function of the voltage over the storage. The inrush current manger supervises rapid increases of either of the both input voltages.

The features presented above and other features, aspects and advantages of the present invention will become better understood with reference to the accompanying figures and the following description. Identical or equivalent elements are in principle provided with the same reference signs.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS

100 rectifier
101 rectifying part of the rectifier
102 constant current source
103 DC output stage
104 re-trigger circuit
105 power stage
106 transistor of the re-trigger circuit
107 power stage transistor
108 power stage resistor
109 filter capacitance
110 comparator/Schmitt trigger
111 diode bridge
112 first bridge arrangements of the rectifying part
113 second bridge arrangements of the rectifying part
202 plot of the input voltage
204 plot of the DC output voltage
206 plot of the input current
208 gate voltage of the transistor 107
211 simulated first phase; initial phase/switching on the rectifier
212 simulated second phase; voltage jump from 100 Vdc to 230 Vac
213 simulated third phase; interruption of input voltage
214 simulated fourth phase; jump from 0V to 230 Vac
215 simulated fifth phase; interruption of the input voltage
300 method
302 first step of the method
304 second step of the method

What is claimed is:

1. An inrush current limiter circuit for a rectifier, wherein the inrush current limiter circuit provides a flow of a current between a rectifying part of the rectifier and a filter capacitance, comprising:

a power stage comprising a power stage resistor and a power stage transistor disposed in parallel circuit arrangement to the power stage resistor;

wherein the power stage resistor is configured to conduct an amount of the current depending on a state of the power stage transistor, wherein the power stage transistor is configured to conduct an amount of the current depending on a charging of a gate capacitance of the power stage transistor; and a re-trigger circuit configured to detect a positive DC bus voltage jump and to reset and turn the transistor off when the re-trigger circuit detects the positive DC bus voltage jump.

2. The inrush current limiter circuit according to claim 1, further comprising a constant current source, wherein the constant current source is configured for charging the gate capacitance of the power stage transistor.

3. The inrush current limiter circuit according to claim 1, wherein a constant current source is configured to charge the gate capacitance of the power stage transistor according to a configured time constant.

4. An inrush current limiter circuit for a rectifier, wherein the inrush current limiter circuit provides a flow of a current between a rectifying part of the rectifier and a filter capacitance, comprising:

a power stage comprising a power stage resistor and a power stage transistor disposed in parallel circuit arrangement to the power stage resistor;

wherein the power stage resistor is configured to conduct an amount of the current depending on a state of the power stage transistor, wherein the power stage transistor is configured to conduct an amount of the current depending on a charging of a gate capacitance of the power stage transistor; and a re-trigger circuit configured to detect a DC bus voltage jump and to turn the transistor off when the re-trigger circuit detects the DC bus voltage jump, wherein the re-trigger circuit comprises a comparator configured to compare a delayed voltage based on a DC bus voltage with an un-delayed voltage based on the DC bus voltage, and to determine that the DC bus voltage jump has occurred when the comparison results in a difference voltage higher than a threshold value.

5. The inrush current limiter circuit according to claim 1, wherein the re-trigger circuit comprises a logic device to generate a control signal to turn the transistor off.

6. The inrush current limiter circuit according to claim 1, wherein the re-trigger circuit comprises a Schmitt trigger configured for detection of the positive DC bus voltage jump.

7. The inrush current limiter circuit according to claim 1, wherein the resistor is an NTC, a PTC, or a temperature independent power resistor.

8. The inrush current limiter circuit according to claim 1, wherein the transistor of the power stage is a MOSFET transistor.

9. A rectifier, comprising:

an inrush current limiter circuit with a power stage, the power stage comprising:

a power stage comprising a power stage resistor and a power stage transistor disposed in parallel circuit arrangement to the power stage resistor;

wherein the power stage resistor is configured to conduct an amount of the current depending on a state of the power stage transistor; and wherein the power stage transistor is configured to conduct an amount of the current depending on a charging of a gate capacitance of the power stage transistor, and further comprising a re-trigger circuit configured to detect a positive DC bus voltage jump and to reset and turn the transistor off when the re-trigger circuit detects the positive DC bus voltage jump.

10. The rectifier according to claim 9, wherein the power stage of the inrush current limiter circuit is arranged in a negative or a positive DC path of the rectifier.

11. The rectifier according to claim 9, wherein the rectifier is configured to supply a constant current source over a positive DC bus voltage of the rectifier.

12. The rectifier according to claim 9, wherein the rectifier is a capacitor-filtered bridge rectifier.

13. A method for limiting an inrush current of a rectifier flowing between a rectifying part of the rectifier and a filter capacitance, comprising:

providing a power stage having a power stage resistor and a power stage transistor disposed in parallel circuit connection to the power stage resistor;

conducting by the power stage resistor an amount of the current in dependence on the state of the power stage transistor;

conducting by the power stage transistor an amount of the current in dependence on a charging of a gate capacitance of the power stage transistor;

re-triggering the power stage transistor by a re-trigger circuit configured to detect a positive DC bus voltage jump and to reset and turn the transistor off when the re-trigger circuit detects the positive DC bus voltage jump.

14. The method according to claim 13, further comprising providing a constant current source configured for charging the gate capacitance of the power stage transistor.

15. The method according to claim 13, further comprising charging the gate capacitance power stage transistor according to a configured time constant.

16. The method according to claim 13, wherein the re-trigger circuit comprises a comparator configured to compare a delayed voltage based on a DC bus voltage with an un-delayed voltage based on the DC bus voltage, and to determine that the DC bus voltage jump has occurred when the comparison results in a difference voltage higher than a threshold value.

17. The method according to claim 13, wherein the re-trigger circuit comprises a logic device to generate a control signal to turn the transistor off.

18. The method according to claim 13, wherein the re-trigger circuit comprises a Schmitt trigger configured for detection of the positive DC bus voltage jump.

* * * * *